United States Patent [19]

Dunn

[11] 4,354,603
[45] Oct. 19, 1982

[54] RIGID MAGNETIC DISC STACKER

[75] Inventor: Floyd Dunn, Sunnyvale, Calif.

[73] Assignee: Dysan Corporation, Santa Clara, Calif.

[21] Appl. No.: 196,504

[22] Filed: Oct. 14, 1980

[51] Int. Cl.³ .................................... B65G 1/12
[52] U.S. Cl. .............................. 211/1.5; 211/41; 414/787
[58] Field of Search .............. 211/41, 40, 1.5, 49 R; 269/48.1, 43; 369/270; 118/500; 414/787

[56] References Cited

U.S. PATENT DOCUMENTS

| | | | |
|---|---|---|---|
| 2,954,222 | 9/1960 | Evans | 118/500 X |
| 3,133,736 | 5/1964 | Bodenroder | 369/270 X |
| 3,260,529 | 7/1966 | Brown | 369/270 X |
| 4,290,734 | 9/1981 | Van Breen | 414/787 X |

*Primary Examiner*—Roy D. Frazier
*Assistant Examiner*—Robert W. Gibson, Jr.
*Attorney, Agent, or Firm*—Townsend and Townsend

[57] ABSTRACT

A stacking device is provided for rigid discs which have an interior aperture. An elongate registry member has cross sectional dimensions slightly less than the interior dimensions of the aperture in the discs. The registry member has a hollow interior and at least six circumferentially spaced axially elongate slots in the outer surface of the member. A pair of sets of elongate rack members are located in the alternating slots in the registry member. Each rack member has a plurality of outwardly directed teeth. The rack members of one set, designated set A, are movable both radially and axially with respect to the registry member. The rack members of the other set, designated set B, are movable radially with respect to the registry member.

The sets of rack members of the present invention are operated to load discs in the following fashion. Set A is moved outwardly to receive a disc with set B recessed. Set A moves downwardly carrying the received disc, and set B moves outwardly to receive the disc from set A. Set A then moves inwardly, upwardly and outwardly to be in a position to receive the next disc. The process is repeated to load a plurality of discs, and is reversed to unload the discs.

6 Claims, 14 Drawing Figures

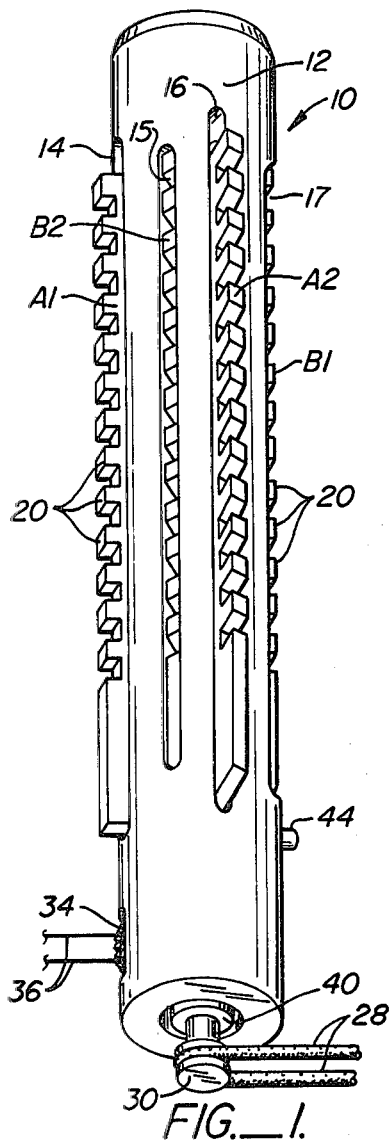
FIG._1.
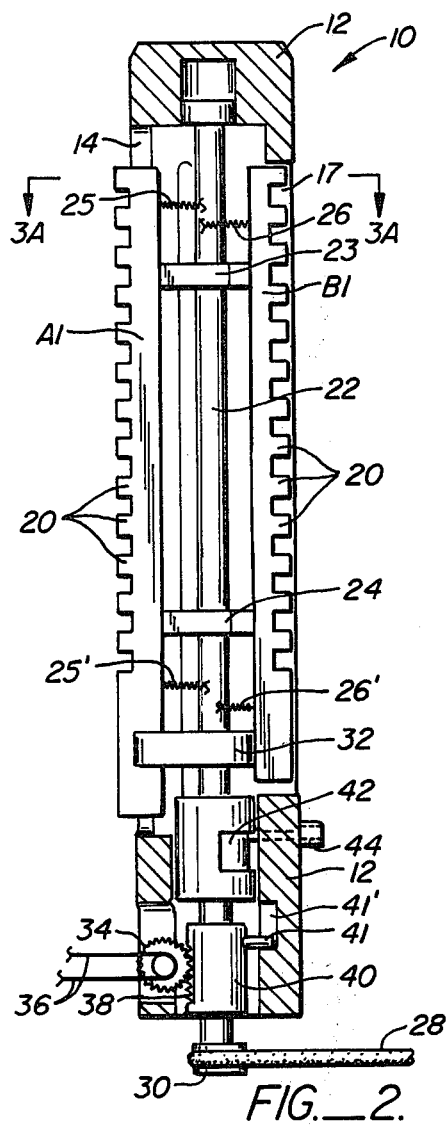
FIG._2.
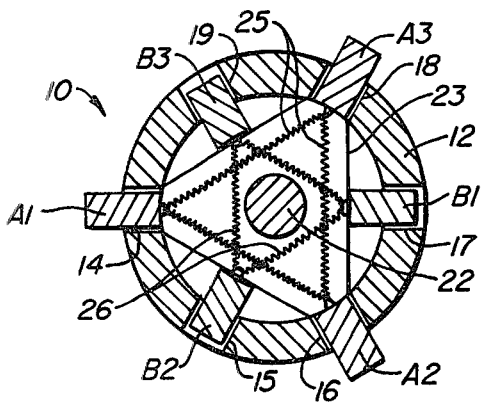
FIG._3A.
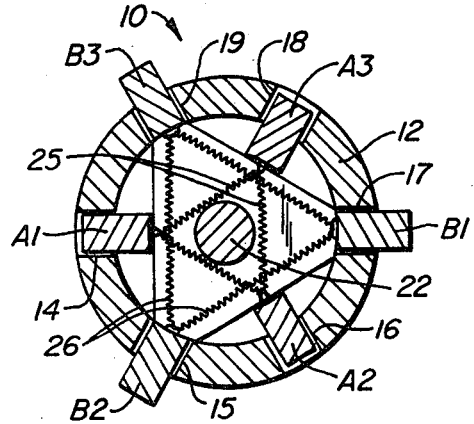
FIG._3B.

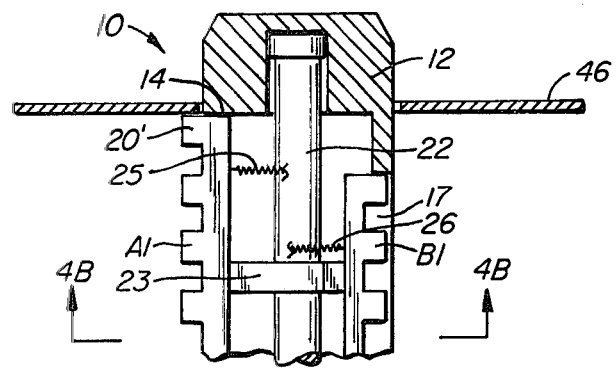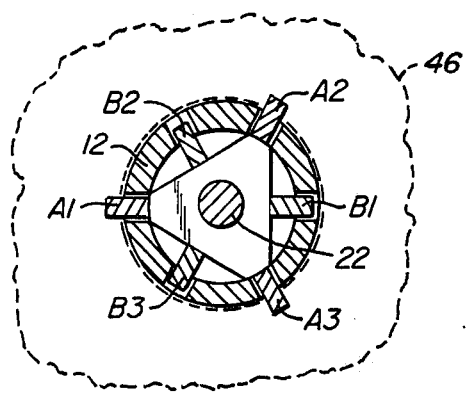
FIG._4A.  FIG._4B.
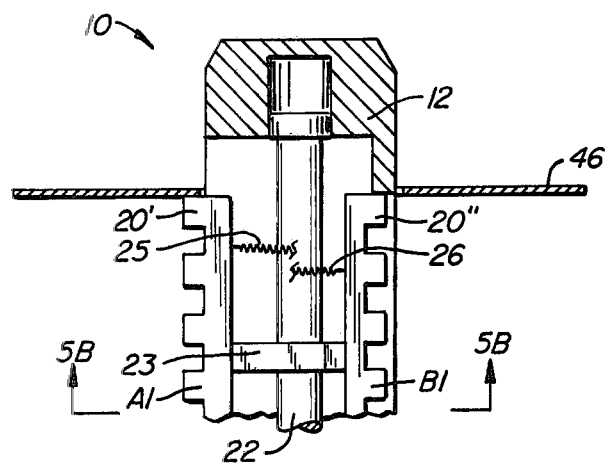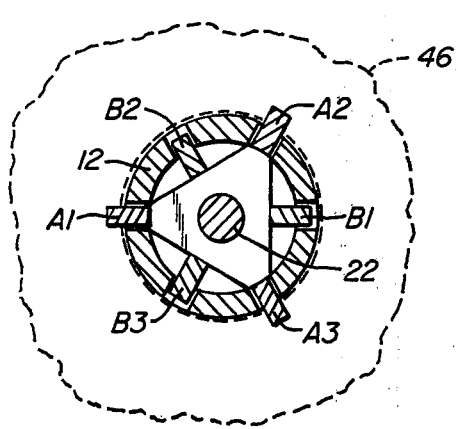
FIG._5A.  FIG._5B.
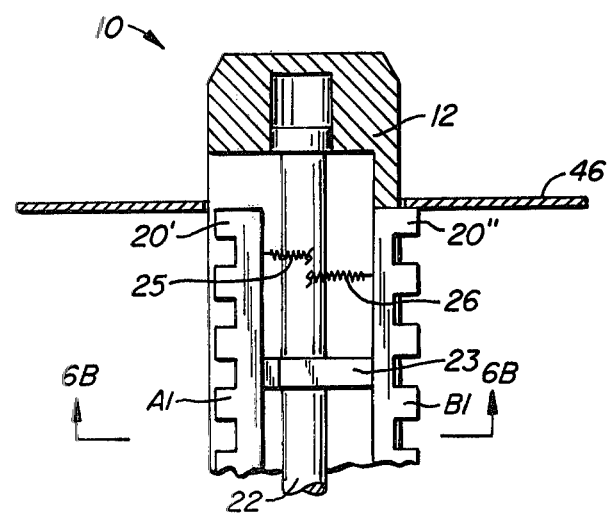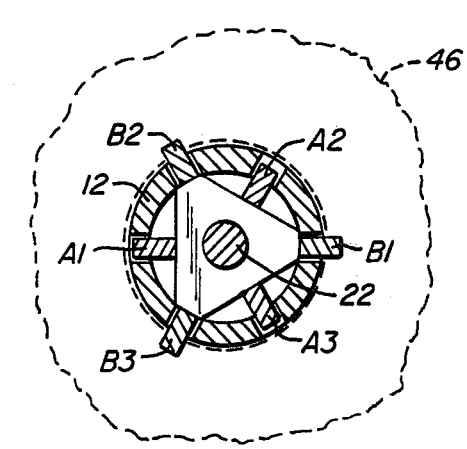
FIG._6A.  FIG._6B.

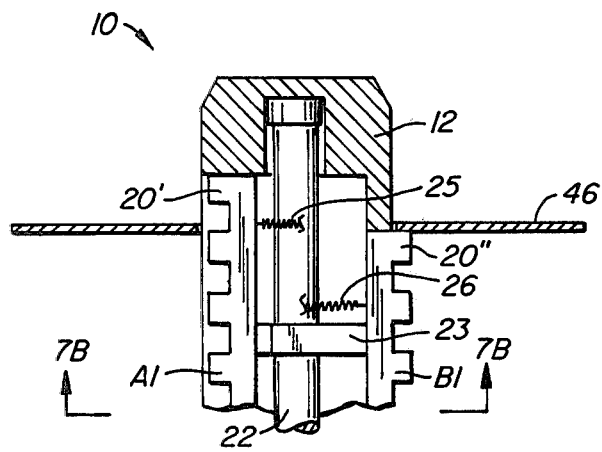
FIG._7A.
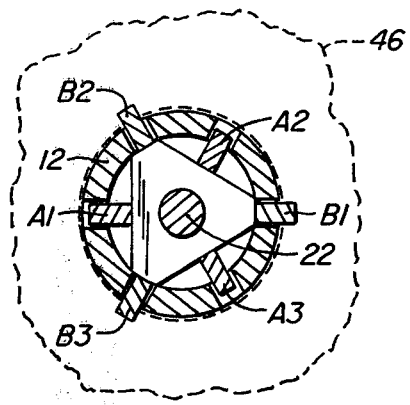
FIG._7B.
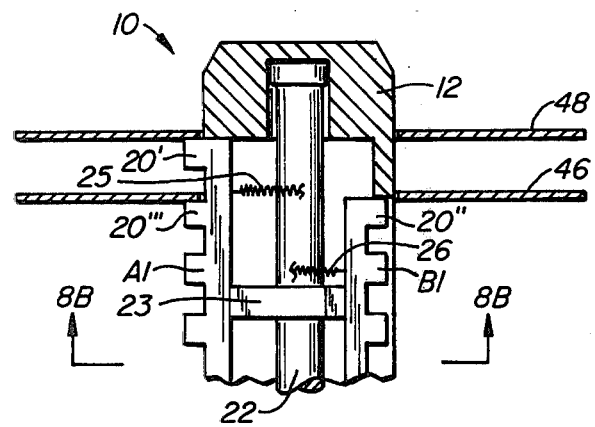
FIG._8A.
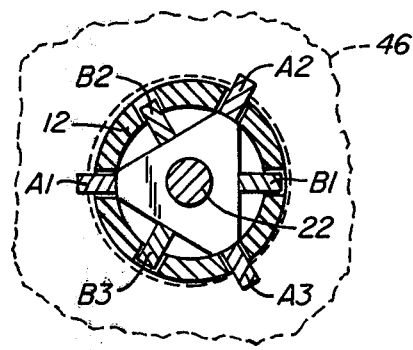
FIG._8B.

RIGID MAGNETIC DISC STACKER

BACKGROUND OF THE INVENTION

The present invention provides a stacking device for rigid magnetic discs to provide temporary storage for the discs during their manufacture.

Rigid discs are often used in modern computers to provide a media for the storage and retrieval of large volumes of data. Such discs typically include a rigid substrate such as aluminum supporting a magnetic surface capable of extremely fine magnetic resolution, so that large volumes of data can be stored on a single disc. Extraordinary quality control must be exercised in the production of the disc to insure that the magnetic surface is free from the imperfections which would distort the stored data.

Rigid magnetic discs are usually manufactured at the present time on assembly lines in which human operators move the discs from station to station. In the course of such movement, the discs must often be stored for a period of time. Such transitory storage is typically accomplished by stacking the discs on vertical cylinders which engage the apertures in the discs. The operator places spacers between each disc to assure that the discs do not touch one another. This procedure, although widespread in the industry, is subject to human error which can render the disc unusable. In addition, such storing techniques are time consuming and inefficient and the use of spacers is not readily subject to incorporation in an automated assembly line.

SUMMARY OF THE INVENTION

The present invention provides a stacking device for rigid discs which have an interior aperture. An elongate registry member is provided which has cross sectional dimensions slightly less than the interior dimensions of the aperture in the discs. The registry member has a hollow interior and at least six circumferentially spaced axially elongate slots in the outer surface of the member. A pair of sets of elongate rack members are located in the alternating slots in the registry member. Each rack member has a plurality of outwardly directed teeth. The rack members of one set, designated set A, are movable both radially and axially with respect to the registry member. The rack members of the other set, designated set B, are movable radially with respect to the registry member.

The sets of rack members of the present invention are operated to load discs in the following fashion. Set A is moved outwardly to receive a disc with set B recessed. Set A moves downwardly carrying the received disc, and set B moves outwardly to receive the disc from set A. Set A then moves inwardly, upwardly and outwardly to be in a position to receive the next disc. The process is repeated to load a plurality of discs, and is reversed to unload the discs.

The present invention thus provides a system for positively engaging and spacing the respective discs so that they do not come in contact with one another. As each disc is loaded, it is automatically spaced from each other disc, eliminating the necessity for adding spacers, a process which is subject to human error. Moreover, the device of the present invention is readily subject to automation, reducing the hand labor required in the assembly of the discs.

The novel features which are characteristic of the invention, as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the preferred embodiment of the present invention;

FIG. 2 is a sectional view of the embodiment of FIG. 1;

FIG. 3A is a cross sectional view taken along lines 3—3 of FIG. 2, and FIG. 3B is a view similar to that of FIG. 3A illustrating the mechanism at a different rotational position of the central shaft;

FIGS. 4A–8A are a sequence of schematic plan view illustrating the operation of the embodiment of FIG. 1, and FIGS. 4B–8B are section views taken along lines B—B of FIGS. 4A–8A.

DESCRIPTION OF THE PREFERRED EMBODIMENT

The preferred embodiment 10 of the disc stacker of the present invention is illustrated generally by way of reference to FIGS. 1–3 in combination. Disc stacker 10 includes a registry member 12 in the form of a hollow cylinder. The external dimensions of registry member 12 are slightly less than the interior dimensions of the central apertures in the discs to be stacked, as illustrated in more detail hereinafter.

Six circumferentially spaced axial slots 14–19 are formed in the outer circumference of registry member 12. Two pairs of sets of rack members, one set of members A1–A3 designated as set A, and a second set of rack members B1–B3 designated as set B. Rack members A1, A2 and A3 are located in respective slots 14, 16 and 18, while rack members B1, B2 and B3 are located in respective slots 17, 15 and 19. Each rack member includes a plurality of outwardly directed equally spaced teeth 20.

A central shaft 22 is located within registry member 12. Central shaft 22 includes a pair of cam surfaces 23, 24 having a generally triangular shape. A pair of endless tension members 25, 25′ interconnect rack members A1–A3 of set A, biasing the rack members against cam surfaces 23, 24. Similar resilient tension members 26, 26′ bias rack members B1–B3 of set B against cam surfaces 23, 24.

FIG. 3A depicts shaft 22 in a rotational position in which cam surfaces 23, 24 bias the rack members A1–A3 of set A outwardly. Correspondingly, the rack members B1–B3 of set B are recessed. In this configuration, the teeth 20 of rack members A1–A3 project outwardly beyond the outer surface of registry member 12, while the teeth of rack members B1–B3 are within the circumference of the outer surface of the registry member.

In the preferred embodiment illustrated, a belt 28 driven by a stepping motor (not shown) circumscribes a pulley 30 at the lower end of shaft 22. Belt 28 rotates shaft 22 between the position depicted in FIG. 3A and a position rotated 60° from that position, as depicted in FIG. 3B. In this latter position, depicted in FIG. 3B, teeth 20 of rack members B1-B3 project beyond the outer surface of registry member 12, while those of rack members A1-A3 are recessed.

In the embodiment shown, a disc 32 circumscribes shaft 32, and engages rack members A1-A3, but not rack members B1-B3. A spur gear 34 power driven by belt 36 from a stepping motor (not shown), engages a rack 38 on a collar 40 connected to shaft 22. Collar 40 is held against rotation by a lug 41 engaging slot 41' in registry member 12. Gear 34 is actuated to move collar 40 and thus shaft 22 axially through a distance equal to the spacing between the teeth 20 on racks A1-A3 and B1-B3, defined by the width of a gap 42 in shaft 22 engaged by set screw 44. In this fashion, shaft 22 can be translated axially to axially move rack members A1-A3 simultaneously.

The operation of disc stacker 10 is depicted by way of reference to FIGS. 4A and B through 8A and B. Referring initially to FIGS. 4A and 4B, shaft 22 is in its raised position so that rack members A1-A3 are in their fully upward position, as depicted by rack member A1 in slot 14. In addition, shaft 22 is rotated so that cam surfaces 23, 24 move rack members A1-A3 outwardly and allow rack members B1-B3 to be recessed. In this position, stacker 10 is in a position to receive a disc 46 on the upper teeth 20' of rack members A1-A3.

Preparatory to loading the next disc on stacker 10, shaft 22 is lowered so that the upper teeth 20' of rack members A1-A3 are at the same level as the upper teeth 20" of rack members B1-B3, as shown in FIGS. 5A and 5B.

Once initial disc 46 has been lowered, as shown in FIGS. 5A and 5B, it is transferred from the rack members of set A to the rack members of set B, as depicted in FIGS. 6A and 6B. Shaft 22 is rotated through an arc of 60° so that cam surfaces 23, 24 force rack members B1-B3 of set B radially outwardly while the rack members A1-A3 of set A are recessed, thus transferring the initial disc 46 from the upper teeth 20' of rack members A1-A3 to the upper teeth 20" of rack members B1-B3.

Rack members A1-A3 are then positioned to receive the next disc in a two-step process, depicted in FIGS. 7A, 7B, and FIGS. 8A, 8B respectively. First, as illustrated in FIGS. 7A and 7B, shaft 22 is moved upwardly, raising rack members A1-A3 to their initial position. After rack members A1-A3 have been raised, shaft 22 is rotated through an arc of 60°, as depicted in FIGS. 8A and 8B, forcing rack members A1-A3 outwardly and allowing rack members B1-B3 to be recessed. This places the upper teeth 20' of rack members A1-A3 in position to receive a second disc 48, and in addition transfers the initially loaded disc 46 from the upper teeth 20" of rack members B1-A3 to the second teeth 20"' of rack members A1-A3.

Further discs are mounted on disc stacker 10 by repeating the steps of FIGS. 4-8. Specifically, the rack members A1-A3 of set A are moved radially and axially to receive discs and move them downwardly while the rack members B1-B3 of set B support the discs while the rack members of set A are moved inwardly, upwardly and outwardly to receive the next discs. The sequence of steps depicted in FIGS. 4-8 are reversed to unload the discs from the stack.

While a preferred embodiment of the present invention has been illustrated in detail, it is apparent that modifications and adaptations of that embodiment will occur to those skilled in the art. For example, a variety of different mechanisms can be used to rotate and translate the central shaft. However, it is to be expressly understood that such modifications and adaptations are within the spirit and scope of the present invention, as set forth in the following claims.

What is claimed is:

1. A stacking device for rigid discs having an interior aperture, said device comprising:

an elongate registry member having external cross sectional dimensions slightly less than the interior dimensions of the aperture in the discs, said registry member having a hollow interior and at least six spaced axial elongate slots in the outer surface thereof;

a pair of sets of elongate rack members located in the alternating slots in the registry member, each said rack member having a plurality of outwardly directed teeth, the rack members of one set, designated set A, being movable radially and axially with respect to the registry member, and the rack members of the other set, designated set B, being movable radially with respect to the registry member; and means for operating the sets of rack members to load discs so that set A moves outwardly to receive a disc with set B recessed, set A moves downwardly carrying the received disc, set A moves inwardly as set B moves outwardly to receive the disc from set A, set A moves upwardly and then outwardly to be in a position to receive the next disc and to take the disc previously received from set B as set B moves inwardly, and the process is repeated to load a plurality of discs and is reversed to unload the discs.

2. The device of claim 1 wherein the registry member has a circular cross section.

3. The device of claim 1 wherein the operating means includes a central shaft within the registry member, and a cam surface on said shaft controlling the radial position of the rack members.

4. The device of claim 3 wherein the shaft engages and moves axially to control the axial movement of the rack members of set A.

5. A stacking device for rigid discs having a circular interior aperture, said device comprising:

a hollow elongate registry member having a cylindrical exterior surface with a diameter no greater than the interior diameter of the aperture of the discs and at least six circumferentially spaced axially elongate slots in the outer surface thereof;

a pair of sets of three elongate rack members located in alternating slots in the registry member, each said rack member having a plurality of outwardly directed teeth, the rack members of one set, designated set A, being movable radially with respect to the registry member, and the rack members of the other set, designated set B, being movable both radially and axially with respect to the registry member;

a rotatable and axially translatable central shaft within the registry member, said shaft having a cam surface bearing against the inside surfaces of the elongate rack members to control the radial positions of said rack members so that the rack members of set A are radially extended at one position of the central shaft with the rack members of set B recessed and vice versa, said shaft engaging the rack members of set A so that axial movement of the shaft causes corresponding axial movement of the rack members of set A; and means for rotating and translating the shaft to load discs by rotating the shaft to move the rack members of set A outwardly to receive a disc with set B recessed, translating the shaft to move set A downwardly carrying the received disc, rotating the shaft to move set B outwardly to receive the disc from set A as it moves inwardly, translating the shaft to move set A upwardly, and rotating the shaft to move set A outwardly to be in a position to receive the next disc and to take the disc previously received from set B as set B moves inwardly, and the process is repeated to load a plurality of discs and reversed to unload the discs.

6. The device of claim 3 or 5 and additionally comprising a pair of spring members engaging the respective sets of tooth members to bias the rack members radially inwardly.

* * * * *